United States Patent Office 3,467,469
Patented Sept. 16, 1969

3,467,469
COVER FOR PHOTOCOPIERS
Dana B. Hastings, Natick, and Laurence R. Cederbaum, Framingham, Mass., assignors to Dennison Manufacturing Company, Framingham, Mass., a corporation of Nevada
Filed Oct. 17, 1966, Ser. No. 587,216
Int. Cl. G03b 27/54
U.S. Cl. 355—67                    7 Claims

ABSTRACT OF THE DISCLOSURE

A photograghic office copier has a motor driven cover for the glass platen on which an original document to be copied is placed. The cover may be initially raised by actuating a manual switch to give access to the platen, and operation of a second manual switch then starts a programmer which lowers the cover and exposes a photosensitive sheet to the orginal.

---

For example, a typical office copier has a transparent platen or record window on which the original is placed face-down. Usually the original is then covered with a blanket or like cover prior to causing the apparatus to go through a printing cycle. In prior copiers of this type it has been necessary for the operator to raise the cover with one hand and remove the original previously placed under the cover with the other hand before picking up and placing a new original upon the window. In high speed office copiers capable of turning out as many as 2,000 copies an hour, the time involved in handling the original seriously reduces the speed of printing.

It is an object of the present invention to provide a way of automatically controlling the cover so as to leave both the operator's hands free to handle the originals.

According to the invention copier apparatus for reproducing an original subject comprises a frame, record window on said frame for holding said original, cover means movably attached to said frame overlying said window, a motor for raising said cover means from and lowering said cover on said window, and switch means for initiating separate raising and lowering movements of said cover means by said motor.

For the purpose of illustration a typical embodiment of the invention is shown in the accompanying drawings in which:

FIGS. 1A and 1B are elevations of details of FIG. 1;

MECHANISM AND OPTICS (FIGS. 1 AND 2)

Operator controls

Figure 1:
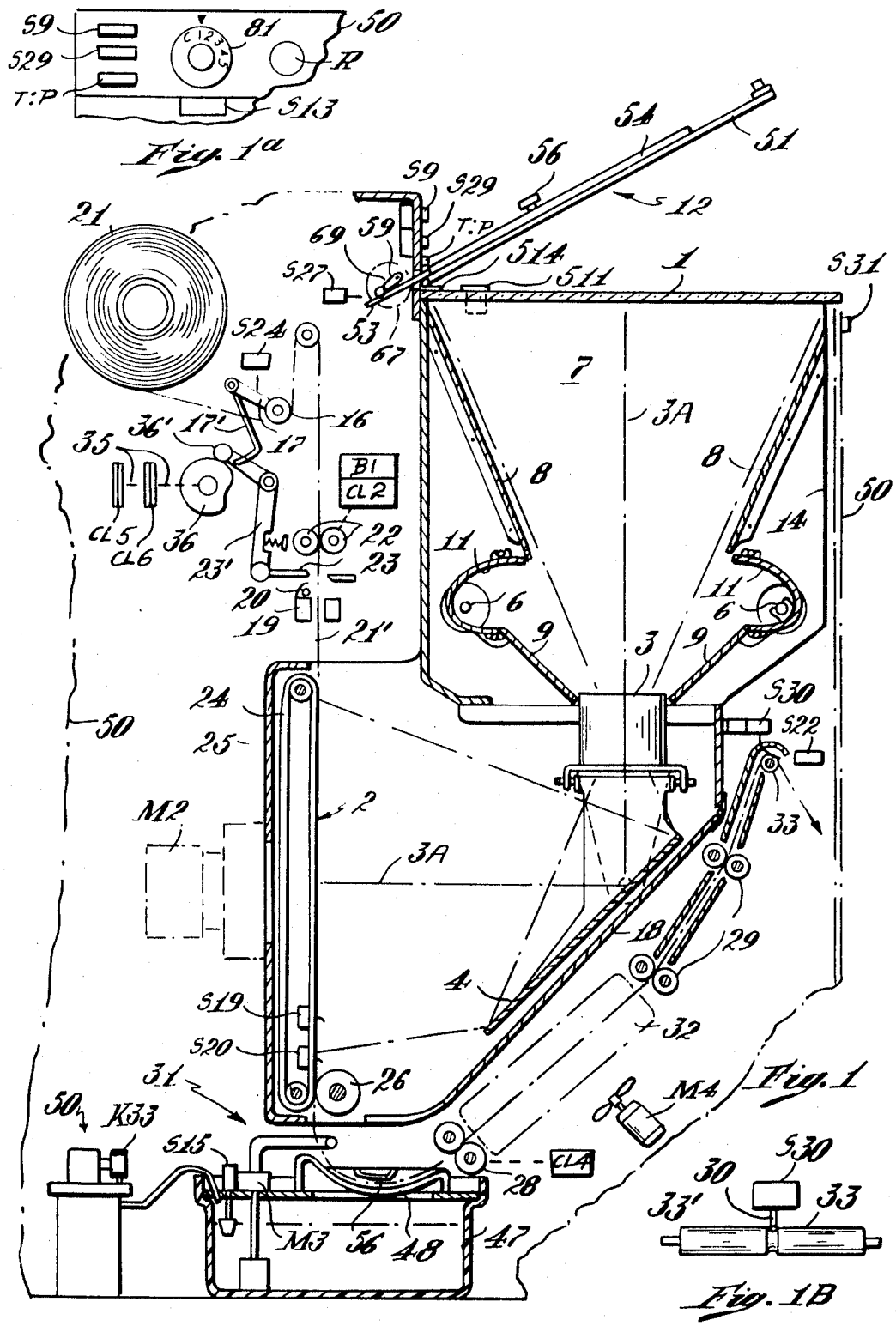
FIG. 1 is an elevation, shown partly in section, of photocopying apparatus.

Briefly, to make a copy with the illustrated apparatus the operator first passes a lift key S31 at the front (right side) of the apparatus causing a cover 12 to lift up from a glass platen 1. An 11 in. original document is then placed face down on the platen with one end against a movable stop 511. For a 14 in. document, the stop 511 is removed and the document end placed against a fixed stop 514. The operator then adjusts a rheostat R (FIG. 1A) which controls the light intensity for proper exposure of the original, and then presses either of two print keys S9 or S29 depending on whether the original is 11 in. or 14 in. long. The cover 12 then closes, exposes a photosensitive sheet of 11 in. or 14 in. length and delivers it developed through an exit roll 33. If only a single copy is to be printed the cover then rises uncovering the original. After a short delay the cover then closes. If a given number of copies are desired the operator turns a numbered control knob 81 to its appropriate position before pressing a print key and the cover 12 does not rise until the desired number of copies are printed. Or if it is desired to print copies continuously, the knob 81 is turned to and locked in a C position prior to pressing a print key. The copier will then print copies continuously, without raising the cover, until the control knob is unlocked and returned to "1" position.

Optics

The original, face-down on the glass platen or record window 1, is illuminated from below the platen by a light box comprising two elongate flash lamps 6 located in curved reflectors 11. Light from the lamps is directed by diffuse reflecting end walls 8 and 9 and specularly reflecting end walls 7 upon the platen and the original an image of the original is focused by a lens 3 at the bottom of the light box upon an image plane 2 to which a photosensitive sheet is fed. At the instant the sheet, moving at about 400 feet per minute, is registered with the image the lamps 6 are flashed for under a half a second photographically stopping movement of the sheet relative to the image.

Preferably the original is illuminated by the light box in a pattern more brightly at its corners and edges than at its center so that the light attrition of the lens is compensated, and the image at the plane 2 is evenly illuminated throughout its area. The stops 511 and 514 on the platen are located so that an 11 in. or 14 in. original will be centered in the illumination pattern of the light box on the central axis 3A of the lens 3. Sensitive switches S19 and S20 are placed in the path of the paper sheets along the image plane 2. As will be explained more fully, when the one of these switches selected by print key S9 or S29 is tripped by the leading edge of a moving photosensitive sheet the lamps 6 are immediately flashed. The first sensitive switch S19 is located such that when it is tripped by the leading edge of an 11 in. sheet, the 11 in. sheet is at a position registered with the corresponding position of an 11 in. original against stop 511 on the platen 1, that is, centered on the image and on the folded central axis 3A of the lens. Similarly, when switch S20 is tripped by a 14 in. sheet, the sheet is registered with the 14 in. image and centered on the axis 3A at the instant of exposure.

Feeding and cutting mechanism

Briefly, print paper having an electrostatically sensitizable coating is fed from a supply roll 21 to a cutter 23 when it is cut into 11 in. or 14 in. sheets 21'. Concomitantly with the feed to the cutter the sheets are fed past a pre-exposure lamp 20 for dissipating accidental charges on the paper, and thence through a high voltage corona discharge device 19 for placing a uniform electrostatic charge over the paper coating. The severed sheets are fed by rolls 22 before the cutter to a porous belt 24 through which air is drawn into a vacuum plate 25 connected to a vacuum pump 24. The belt 24 carries the severed sheet along the image plane 2 to the paper sensing switches S19 and S20 where the sensitized paper is exposed. Thence the paper is fed by a roll 26 into a developer 31 comprising a reservoir 47 of developer or electrostatic toner fluid and a tray 48 through which the paper passes. Toner is supplied from the reservoir 47 by a pump M3 to the tray 48 from which it spills back into the reservoir. A float switch S15 senses depletion of toner from the reservoir 47. An intensifier supply 50 of concentrated toner actuated by a solenoid K33 may be actuated manually or automatically to increase the concentration of the toner in the reservoir 47. Beyond the developer 31 the sheet is fed by rolls 28 to a drier 32, and thence by rolls 29 to an exit roll 33. At the exit roll 33 the paper sheet is sensed by a switch S30 with a finger 30 which normally rides in a groove 33' in the roll 33, the switch S30 being actuated when a sheet on the roll lifts the finger from the groove. Beyond the exit roll 33 an exit switch S22 senses the arrival of paper at the exit.

After leaving the supply roll 21 the paper passes over an idler roll 16 on a dancer arm 17. If the paper roll 21 is exhausted or the paper breaks, the dancer arm drops actuating a paper empty switch S24 and swings a connected hook 17' under a cam follower roll 36'. The cam follower roll 36' rides on a cutter cam 36 and is part of a crank 23' carrying the proper cutter blade 23. The cam 36, rotates on a cam shaft 35 driven at one of two speeds through clutches CL5 or CL6, alows the spring-urged crank 23' to drive the cutter blade 23 through the paper 21 severing sheets 21' therefrom in lengths of 11 in. or 14 in. as will be described under the heading Print Cycle.

The rolls 22 feeding the paper to the cutter 23 are controlled by a combination electromagnetic brake B1 and clutch CL2. The rolls 28 at the drier 32 are controlled by an electromagnetic clutch CL4.

Figure 2:
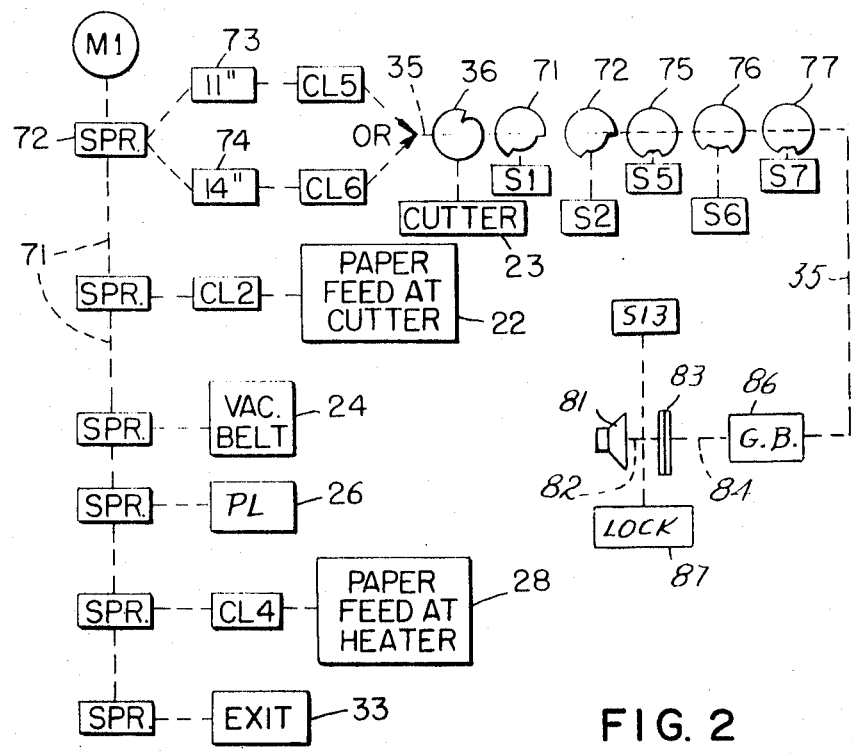
FIG. 2 is a schematic diagram of the mechanism of the apparatus.
Figure 3:
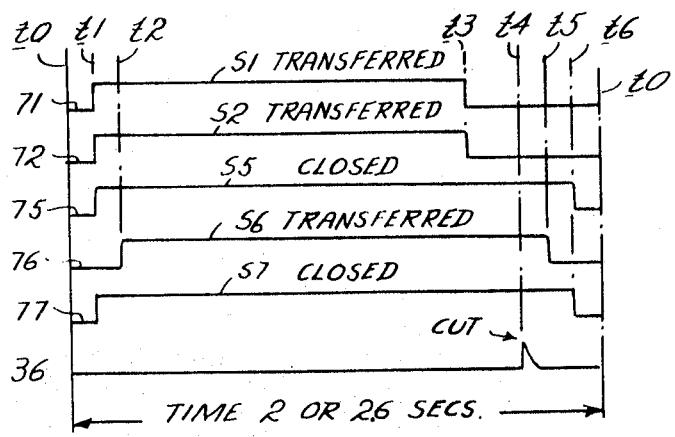
FIG. 3 is a time graph of the cycle of cams shown in FIG. 2.

The mechanisms so far described are driven by a motor M1 through a sprocket chain 71 and sprockets 72 as shown in FIG. 2. One sprocket 72 drives sprocket 73 and 74 at different speeds. These sprockets are alternatively connected by the electromagnetic clutches CL5 and CL6 to a cam shaft 35 to drive the cam shaft at one of two speeds. Mounted on the cam shaft are the cutter cam 36, and additional cams 71, 72, 75, 76 and 77 respectively actuating switches S1, S2, S5, S6 and S7 in a cycle shown in FIG. 3.

In addition the cam shaft 35 drives the multiple copy control knob 81 through a step down gear box 86, a shaft 84, a slip clutch 83 and a shaft 82. The control knob 81 has a C position and numbered positions from "1" to "25." When turned to a numbered position other than "1" the knob 81 actuates a switch S13. The step down ratio of the gear box 86 is such that the knob 81 makes one rotary step from number to number back toward "1" (see FIG. 1A) for each 360° cycle of the cam shaft 35. Also the knob 81 may be held by a lock 87 in a C position actuating the switch S13 but preventing rotation of the knob. The slip clutch 83 yields when the knob is in the "1" or C position, and when the knob is manually turned from "1" to a higher numbered position.

Other mechanisms

The platen cover is raised and lowered by a motor M5 as described under the heading Platen Cover Operation. A blower M4 is associated with the drier 32 as are thermostatic switches and heaters shown schematically in FIG. 5 and described under the heading Auxiliary Circuits.

PLATEN COVER OPERATION (FIGS. 1 AND 6)

The cover 12 comprises a blanket 51 detachably hinged by pins 52 to the copier frame 50 at one end of the platen 1. A rod 53 slides lengthwise of the blanket in a sleeve 54 fixed to the blanket. A thumb screw 56 extending through a slot 57 in the sleeve sets the rod extended from the sleeve as shown, or when loosened, allows the rod to be retracted in the sleeve for removal of the cover from the frame.

In operation the rod extends through the frame to a crank 58 having two spaced arms 59 and 61 coupled by a spring 62 and pivoted on a bracket 63. The cover lift arm 59 carries a roller 64 bearing on the rod 53. The crank arm 61 is engaged by a roller 66 mounted eccentrically on a disc 67. The disc is driven by a lift M5 through a reduction gear box 68 and a shaft 69. The shaft 69 carries a cam 71 having a groove 72 which closes two sensitive switches S25 and S26 at different positions of the shaft. UP switch S25 is opposite the groove and is closed except when the blanket has opened to its limit of about 55° relative to the platen 1. DOWN switch S26 is closed except when the blanket is closed on the platen.

Rotation of the shaft causes the eccentric roller 66 to depress crank arm 61 which, through the spring 62, depresses crank 59 and rod 53 thereby swinging the blanket 51 off the platen 1. Further rotation of the shaft lowers the blanket. Operation of the blanket is initiated by a lift key S31. Manually depressing the cover when open does not damage the rod 53 or associated structure, because the spring coupling 62 will yield.

Figures 4, 4A:
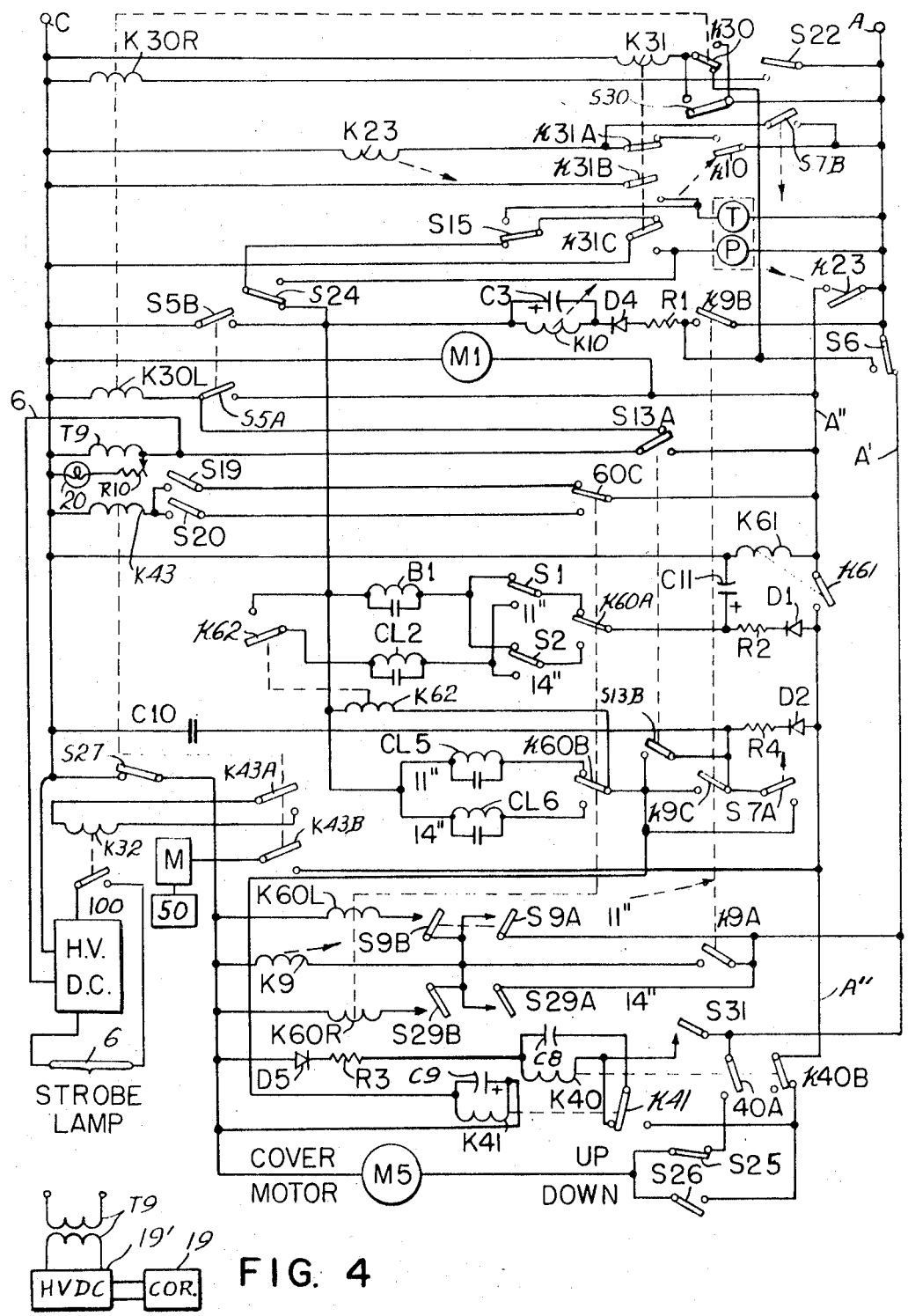
FIGS. 4 and 5 are schematic diagrams of the electrical circuits of the apparatus of FIG. 1.

With the control circuit of FIG. 4 in stand-by, the lift key S31 is pressed momentarily, charging a 200 microfarad capacitor C8 in parallel with a 10 kilohm DC relay K40 and its rectifier D5 across the alternating current busses A' and C. Relay K40 is energized transferring its contacts $k$40A and $k$40B. Current then flows from the bus A' through contact 40A and the cover UP switch S25 to the cover lift motor M5 causing the blanket to be lifted fully by the crank 58 on shaft 69. After transfer of contact $k$40A the lift key S31 has no effect. As soon as the shaft 69 turns, the DOWN switch S26 closes. DOWN switch S26 and UP switch S25 remain closed until the cover is fully lifted. At that time the cover lift shaft cam 71 opens the UP switch S25 stopping the lift motor M5.

Capacitor C8 discharges shortly after the cover is raised during a 5 second interval determined by the value of the capacitor and relay coil. The charge bleeds through the relay K40, and K40 is then deenergized retransferring its contacts to the position shown. The operator may then lay an original document on the platen under the opened cover. He then presses one of two double pole print keys S9 or S29, depending on the length of the original to be copied. Key S9 is pressed for an 11 in., letter-size original, key S29 for a 14 in., legal-size original.

At the start of the print cycle, described more fully hereinafter, relays K9, K10 and K23 are energized, the latter closing contact $k$23 and supplying power to the third bus A". A time delay relay K61 is then energized and closes its contact $k$61 after about 2 seconds and supplies power to the cover motor M5 through contact $k$40B and now closed sensitive switch S26. The motor lowers the blanket to the platen and is then turned off by opening the sensitive switch S26. During the print cycle initiated by closing one of the print keys S9 or S29 a cam switch S7A is closed energizing a relay K41 during a period of about 2 seconds determined by the time constant of its resistance (10 kilohms) and the capacitance of a parallel capacitor C9, and transferring its contact $k$41 to connect capacitor C8 to the A" bus. Capacitor C8 is charged without energizing its parallel relay K40, and when, after exposure, cam switch S7A retransfers deenergizing relay K41, contact $k$41 returns to the position shown, and capacitor C8 discharges through and energizes relay K40. The capacitor discharges for an interval of over two seconds through the relay coil transferring contacts $k$40A and $k$40B, the former of which completes a connection from the secondary bus A' through sensitive switch S25 and the cover motor M5. The motor raises the cover closing sensitive switch S26 and, when the cover is raised, opening switch S25. The discharge of capacitor C8 continues long enough to allow the operator to remove the document just copied and to place another on the platen. Then, when the discharge is complete K40 is deenergized transferring its contacts k40A and k40B to the position shown in FIG. 4 and completing a circuit through contact k40B, switch S26 and the cover motor which lowers the cover to the platen, closes switch S25 and, when the cover is lowered, opens switch S26. The cycle is then complete, and a new print cycle may be started by pressing one of the print keys S9 or S29. If a new print cycle is not started the tertiary bus A″ is disconnected by opening of relay contact k23, as is explained more fully under the heading Print Cycle.

When the control knob 81 is in C or a numbered position other than "1," the switch S13B transferred by the knob bypasses cam switch S7A holding relay K41 energized and contact k41 transferred and preventing discharge of capacitor C8 through relay K40. When the switch S13B is opened when the control knob 81 returns to "1," subsequent operation of cam switch S7B causes the cover raising previously described.

PRINT CYCLE (FIGS. 1 to 4)

Figure 5:
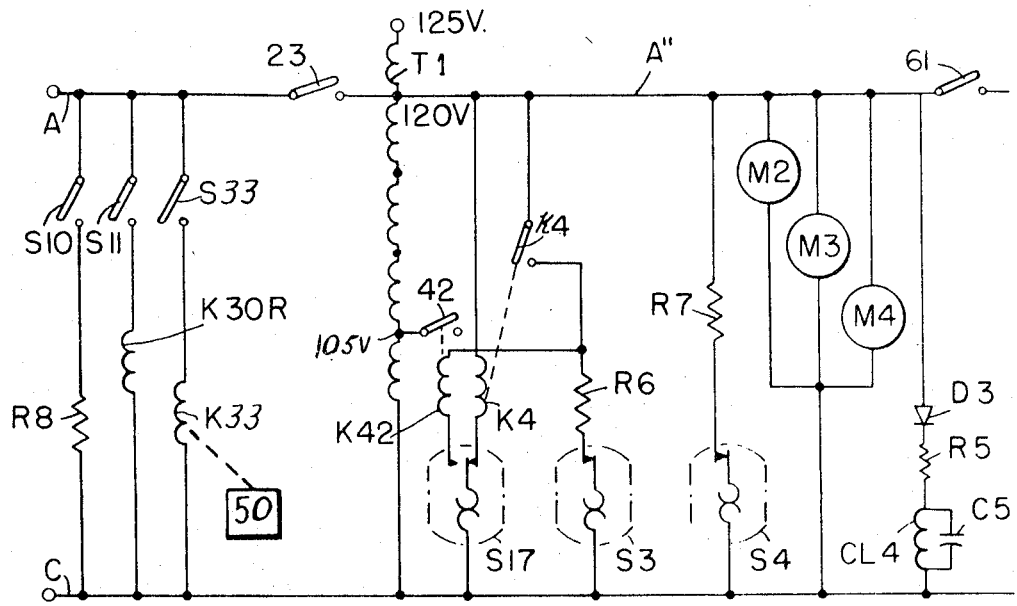

The copier is capable of printing a single copy of each original. Also, if the Multiple Copy control 81 is set otherwise, a selected multiple of the original are printed automatically, or the copier may be set to print continuously either one or successive originals. Following is a description of a single print cycle. Automatic printing is described under the sub-heading Multiple and Continuous Cycling. Other components not entering directly into the print cycle are shown in FIG. 5 and described under the heading Auxiliary Circuits.

Single print cycle

With an original document on the platen or copy window 1, and with the cover 12 lowered on the platen, feeding, cutting and exposure of the print paper is initiated by either the 11 in. PRINT key S9 or the 14 in. PRINT key S29 selected by the operator according to the size of the original. Closing the ganged contacts S9A and S9B of key S9 energizes the latch coil K60L of a latching relay K60, which includes a reset coil K60R, and throws contacts k60A, k60B and k60C to, and latches them in, the position shown in FIG. 4 if they are not so transferred. Alternatively, the ganged contacts S29A and S29B of key S29 energize the reset coil K60R transferring contacts to, and latching them in, the position not shown.

Figure 6:
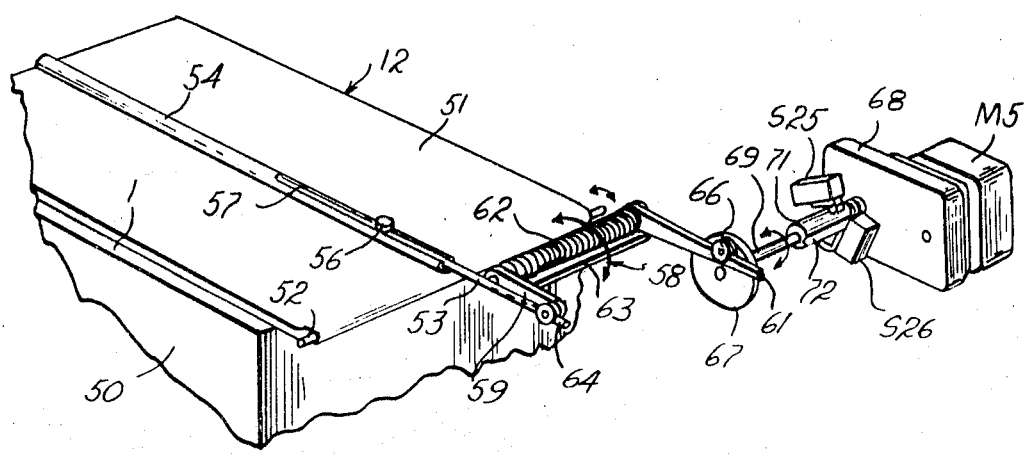
FIG. 6 is an isometric view of part of the apparatus of FIG. 1.

Closing either key S9 or S29 also energizes a primary start relay coil K9, closing its contacts k9A, k9B and k9C. Contact k9A completes a connection from the secondary bus A′ holding relay K9 energized until cam switch S6 opens later disconnecting bus A′. Contact k9B charges a capacitor C3 with current rectified by a diode D4 and resistor R1 of a secondary start relay K10 by a connection from the main power bus A through the coil K10, a switch 24, switch S15 and relay contact k31C to the common bus C. The contact k10, closed when relay K10 is energized, energizes a main power relay K23 through contact k31A of relay K31. Contact k23, then closed by relay K23, connects the main power bus A to the tertiary bus A″. Components shown in FIG. 5 and described under the heading Auxiliary Circuits are then energized. But primarily contact k23 energizes the main motor M1 thereby driving the non-clutched paper feed rolls and belt and the cam shaft 35, and supplies current through bus A″ to cam switch S1 or S2, of later significance, and through now closed relay conatct k9C to clutch CL5 or CL6, whichever has been selected by contact k60B of latching relay K60. As previously explained, relay K60 is latched either in L or R position depending on whether print switch S9 (for an 11 in. original) or S29 (for a 14 in. original) has been pressed to start the print cycle. Whichever of clutches CL5 or CL6 is energized, the corresponding sprocket 73 or 74 is now (time t0 in FIG. 3) connected to the cam shaft 35 to begin to drive it at one of two speeds. For an 11 in. original document the drive speed of sprocket 73 is faster. Because the paper feed rolls 22 just beyond the paper supply roll 21 are not yet clutched by CL2, paper feed does not begin until after the cam shaft 35 starts turning at time t0 (FIG. 6).

At time t1 cam switches S1, S2, S5 and S7 are transferred from the positions shown in FIG. 4 with the following six effects:

(1) Cam switches S1 and S2 break the connection from bus A″ to the braking coil B1 of a combined brake-clutch B1–CL2, and energize the clutch coil CL2 connecting the corresponding main drive sprocket 72 to the paper feed rolls 22 at the paper cutter 23. Paper feed through the cutter to the suction belt 24 is thus started.

(2) Closing of cam switch S5B completes a holding circuit for energized relay K10.

(3) Cam switch S5A, through S13A, energizes the transformer T9 of the high voltage power supply 19′ for corona paper sensitizer 19 and the paper pre-exposing lamp 20, and directly energizes the L coil of a latching relay K30L. The relay contact k30 then closes, energizing a time delay relay K31 which does not close its contact k31 for an interval of about five seconds, longer than the normal time from the start of the print cycle until the discharge of a print past the exit switch S31. In the event that a print becomes jammed in its path and cannot trip the exit switch within five seconds, closing of contact k31 initiates a stopping sequence described under the heading Malfunctions.

(4) Closing of cam switch S5B at time t1 bypasses switch S24, malfunction switch S15 and the time delay relay contact k31C during the print paper feeding, cutting and exposing portions of the print cycle, to avoid interruption of these operations once they have begun.

(5) Closing of cam switch S7A bypasses relay contact k9C which is opened at time t2.

(6) Closing of cam switch S7B holds energized relay K23, which in turn holds the tertiary bus A″ energized even if relay K31 should open its contact k31A. This insures that the paper feed and cam shaft drive will complete feeding and cutting of a sheet of print paper even if a jam of paper develops as detected by failure of exit switch S22 to be transferred during the time delay period of relay K31.

At time t2 cam switch S6 alone is transferred from the secondary bus A′, as shown in FIG. 4, to its alternate position connecting the main power bus A to relay K10, thereby holding the relay energized. Disconnecting power from the secondary bus A′ deenergizes relay K9 whose contact k9C was bypassed at time t1 by cam switch S7A, and also disables the lift switch S31.

At time t3 cam switches S1 and S2 are returned to the position shown in FIG. 4, deenergizing the clutch CL2 and energizing brake B1 connected to feed rolls 22 and thereby unclutching and braking the leading end of paper from supply roll 21, whose length beyond the cutter 23 is determined by the speed at which the cam shaft 35 is driven by clutch CL5 or CL6.

At time t4 this length of paper is severed from the supply when the cutter cam 36 actuates the cutter 23. The leading end of the severed sheet of paper is held on the continuously running belt 24 by the vacuum plate 25, and therefore is carried on to the sensitive switches S19 and S20 in the path of the leading edge of the sheet.

At time t4+ the leading edge of the severed sheet successively closes switches S19 and S20. But only one of these switches is effective, depending on the position of relay contact k60C, which in turn depends on whether the 11 in. print key S9 or the 14 in. print key S29 was pressed to initiate the printing cycle. As shown in FIG. 1 the 11 in. paper switch S19 is in advance of the 14 in. paper switch S20, and is disposed with respect to the print window 2 such that when S19 is tripped an 11 in. sheet of print paper is centered in the print window 2 in optical register with an 11 in. original document located on the platen or record window 1 by the stop 5 and centered on the optical axis. Paper switch S20 is so positioned 1½ in.

beyond switch S19 that when a 14 in. sheet of print paper trips it, the sheet is centered in optical register with a 14 in. original document located on the platen 1 with one edge at the left hand end thereof.

At the instant $t4+$ when the enabled paper switch S19 or S20 is tripped the exposure trigger relay K43 is energized and its contact $k$43A energizes a relay K32 in the high voltage supply 100 of the stroboscopic exposing lamps 6. At this instant the original document on the platen is illuminated and its image is focussed on the severed print sheet centered in the print window 2.

At time $t4+$ relay contact $k$43B is also closed, energizing a meter M which counts the number of exposures and periodically replenishes the developer in the developer tray 48 by electromagnetic activation of a liquid developer intensifier dispenser 50. As shown in FIG. 5 the intensifier may also be caused to dispense a dose of intensifier by actuation of a manual switch S33 which activates the coil K33 of the intensifier. Relay contact $k$43B also initiates a platen cover opening sequence described under the heading Platen Cover Operation.

Following exposure the print is fed through the developer 31, dryer 32 to the exit switch S22 which is tripped by the leading edge of the exiting developed and fixed print. During the developing, drying and exiting a new print cycle may be started. However, the print cycle concludes with the following cam switch operation.

At time $t5$ cam switch S6 is returned to the position shown in FIG. 4 deenergizing relays K10, and K61 successively and resupplying the secondary bus A' for subsequent operation of the cover lift relay K40 and the PRINT switches S9 and S29.

At time $t6$ cam switches S5A, S5B, S57A and S57B return to the start position shown in FIG. 4. Switch S7B deenergizes relay K23 removing supply from the tertiary bus A''.

MULTIPLE AND CONTINUOUS CYCLING

The copy selector operator control 81 comprises a knob normally set at numeral "1" for printing a single copy of an original each time the operator initiates a print cycle. This dial may be set to print any number of copies of the same original up to twenty-five by turning the dial to the correspondingly numbered position from which it is stepped back toward "1" position as each copy is printed. Or it may be locked in position C so as to print copies continuously until turned from position C.

When set either to C position or a numbered position the cam 62 rotated by control 61 transfers ganged switches S13A and S13B. Switch S13A, when transferred from the position shown in FIG. 4, breaks the connection from bus A'' through cam switches S5A and S13A to the transformer corona sensitizer 20 and pre-exposing lamp, but makes a direct connection from bus A'' to the sensitizer and lamp. Thus while more than one copy is being made the sensitizer and lamp remain continuously energized as sheets of print paper are rapidly fed thereby. Switch S13B bypasses relay contact $k$9C and maintains the cam shaft 35 in continuous rotation through clutch CL5 or CL6. Thus the copier continues to execute print cycles until the control knob 81 is stepped back to position "1" opening switches S13A and S13B.

AUXILIARY CIRCUITS (FIG. 5)

FIG. 5 shows circuits and components auxiliary to the circuits of FIG. 4 and includes those continuously supplied by the main power bus A, and by the tertiary bus A'' after K23 is energized at the start of the print cycle.

A humidistat switch S10 responds to excess humidity within the copier housing 50 by closing and supplying current to a heater R8 which reduces humidity. A manual switch S11 within the housing may be closed by a service man to energize the R coil K30R of the latching relay K30 with the same resetting effect as transfer of the exit switch S22. A manual switch S33 may be operated by a serviceman to energize a relay K33 which electromagnetically activates the liquid intensifier dispenser 50 in the manner of meter M described under the heading Print Cycle.

When the tertiary bus A'' has been supplied through relay contact $k$23A at the start of the print cycle three motors M2, M3 and M4 are continuously energized. A vacuum is drawn at the plate 25 (FIG. 1) by motor M2. Motor M3 pumps toner from the developer tank 47 to the developer tray 48. Motor M4 continuously circulates air through the drier 32. The clutch CL4 is coupled to the paper feed rolls 28 at the drier 32.

Assuming that the apparatus is at ambient temperature and a thermostatic switch S17 is in the position shown in FIG. 5 a relay K4 is energized closing its contact $k$4 and supplying 120 volt current to a 1300 watt heater R6 located in the drier 32. As the temperature rises, the contact of the thermostatic switch S17 transfers from the position shown deenergizing relay K4 and energizing relay K42. Relay contact $k$42 then drops the current supplied R6 to 105 volts. An auxiliary 500 watt heater R7 is supplied directly from the tertiary bus A''. Both heaters R6 and R7 are disconnected by overheat thermostatic switches S3 and S4 respectively, in the event that the temperature within the apparatus becomes excessively high.

MALFUNCTIONS

In normal operation the paper supply roll 21 and the paper toner in tank 47 will become exhausted. These conditions are indicated visually by lamps P and T in the circuit of FIG. 4. In addition the circuit prevents or minimizes the effects of such occurrences as jamming of the paper along its path between the cutter 23 and the exit roll 33, wrapping of the paper around the exit roll 33, and failure of circuit components controlling the paper feed clutch CL2 which results in feeding continuous or longer than standard 11 in. or 14 in. sheets. The circuit of FIG. 4 also prevents response to a malfunction from stopping the paper cutter 23 while it has only partially severed a sheet of print paper.

Paper exhausted

When the last length of paper leaves the supply roll 21 the idler roll 16 carried on the dancer arm 17 drops causing the dancer arm to transfer switch S24 and also lifting the cutter bell crank 23' off its cam 36. On transfer of switch S24 from the position shown a connection is completed from the primary bus A through the Paper Empty indicator lamp P, switches S24 and S15 and relay contact $k$31C to the common bus C. Lighting of lamp P thus visually indicates the exhausted paper condition. Transfer of switch S24 also disconnects the common return circuit for brake B1 and clutches CL2, CL5 and CL6 when cam switch S5B opens at time $t6$, the end of the print cycle, after cutting and exposure of the last full length of paper from the supply roll 21. Thus a subsequent print cycle is prevented until a new supply roll of paper has been inserted. A later cycle might start with less than 11 in. length of paper available. Such short lengths are apt to jam along the feed path, and their feed in prevented by stopping print cycles subsequent to paper exhaust or breaking. In addition dropping of the dancer arm 17 will swing an attached hook 17' under the cutter cam follower roll 36' and prevents the cutter crank 23' from moving the cutter 23 into the paper path.

Toner exhausted

Liquid paper toner in the developer tank 47 is slowly removed by print sheets until a significant drop in level is detected by the float switch S15. Transfer of switch S15 then completes a circuit from the main bus A through a Toner Empty indicator lamp T, and relay contact $k$31C to the common bus C. Lack of adequate toner is thus visually indicated.

Paper jammed

In normal operation a developed sheet of paper will transfer the exit switch S22 before the time delay relay K31 closes at the end of the predetermined approximately five seconds delay period. The reset coil K30R of the latching relay is then energized, opening its contact k30 and stopping and resetting the time delay relay K31. The print cycle then concludes normally as described at the end of this section entiteld Print Cycle.

Infrequent defects in the print paper may result in the leading edge of the paper becoming jammed along its path from the cutter 23 to the exit roll 33. In this event the exit switch is not tripped by the printed sheet and the time delay period of relay K31 ends with transfer of relay contacts k31A, k31B and k31C. Unless cam switch S7B is closed, transfer of contact k31A will deenergize the auxiliary start relay K23 whose opening contact k23 removes power supply to the tertiary bus A''. If cam switch S7B is closed, relay K23 will remain energized until time t6, allowing the cutter cam 36 to conclude severing a sheet of paper at the cutter 23, and avoiding initiation of a subsequent print cycle with a partially severed sheet at the cutter. Then opening of switch S7B will deenergize relay K23, cut power to the bus A'' and prevent further mechanical operations until the jam has been cleared.

The necessity of clearing a jam is visually indicated by simultaneous illumination of both lamps T and P upon transfer of relay contacts k31B and k31C which are directly connected to the common bus C. Since it is extremely unlikely that paper and toner will become exhausted simultaneously, the dual illumination of lamps P and T is a reliable indication of a jam.

Exit roll wrapping and continuous sheet (cam shaft stopped)

It is possible that an exiting print will trip the exit switch S22 but then wrap around the exit roll 33. In this event a sensitive switch S30 feeling a portion of the exit roll not normally covered senses the wrapped paper and closes until the print is removed. Switch S30 holds the time delay relay K31 energized until, at the end of its period, it deenergizes relay K23, stopping machine operation, and lights both lamps T and P as described above.

Other component failures

If during the interval from time t0 (when closing switch S9 or S29 initiates the print cycle) to time t1 (when cam switch S5A closes) a trouble develops which prevented turning of the cam shaft 35, the auxiliary heaters, blowers and motors shown in FIG. 5 and other components fed by bus A'' would operate continuously because the print cycle can not be completed by termination of the cam shaft cycle. Relay K30L would not be energized by cam switch S5A, and relay K31 would not start its timing out cycle to deenergize K23 and cause contact k23 to disconnect power from the tertiary bus A''. To prevent this occurrence during time t0 to time t1, a connection is provided between the normally open contact k9B and the normally closed contact k30. Through this connection relay K31 is energized from the primary bus A until cam switch S6 at time t2 deenergizes bus A'' and relay K9. By this time cam switch S5 will have closed if operation is normal. If operation is faulty S6 will not transfer and relay K31 will time out, deenergize relay K23 and break power through contact k23 to the components supplied by the tertiary bus A''.

Overlength sheet

If a circuit component associated with either of the cam drive clutches CL5 or CL6 should malfunction during the print cycle before cutting is started the paper feed clutch CL2 could continue to feed paper from the roll 21. Malfunction of switches S7A, switch 13 or relay K9, or failure of diode D2 or resistor R4 can produce such a condition. To prevent its occurrence a relay K62 is connected in parallel with the clutches CL5 and CL6 and is energized with them, closing its contact k62 which enables energization of the paper feed clutch CL2. A malfunction which deenergizes the cam drive clutches CL5 and CL6 will also deenergize relay K62, opening contact k62 and disabling the feed clutch to stop paper feed.

SUMMARY

From the foregoing specification it can be seen that the present invention provides a way for automatically raising the cover from the platen or record window leaving the operators hands free to remove and replace originals on the record window, and further simplifying operation of the machine by coordinating the print cycle starting key with operation of the cover.

It should be understood that the present disclosure is for the purpose of illustration only and that this invention includes all modifications and equivalents which fall within the scope of the appended claims.

We claim:

1. Copier apparatus for reproducing an original subject comprising:
   a frame,
   a record window on said frame for holding said original,
   cover means movably attached to said frame overlying said window,
   a motor for raising said cover means from and lowering said cover on said window,
   first switch means for initiating raising movement of said cover means by said motor,
   programming means for exposing a photosensitive sheet to said original, and
   second switch means for starting said programming means including switch means causing lowering movement of said motor prior to said exposing.

2. Copier apparatus according to claim 1 characterized by a first motor switch stopping said motor at the end of said cover raising movement, and a second motor switch stopping the motor at the end of said cover lowering movement.

3. Copier apparatus for reproducing an original record comprising:
   a frame,
   a record window on said frame for holding said original,
   optical means for projecting an image of said original on an image plane,
   programming means for feeding a photosensitive sheet to said image plane and exposing said sheet to said image,
   cover means movably attached to said frame overlying said record window,
   a motor for raising said cover means from and lowering said cover means on said window in two respective steps,
   first switch means for starting the raising step of said motor, and
   second switch means for starting said programming means, said programming means including switch means actuated before said exposing for starting the motor lowering step thereby to cover the record window prior to said exposing.

4. Apparatus according to claim 3 wherein said programming means including third switch means actuated at said exposing for causing a cover raising step of said motor.

5. Apparatus according to claim 4 characterized by timed relay means first causing a cover raising step as aforesaid and then causing a cover lowering step.

6. Apparatus according to claim 3 characterized by a control circuit causing said programming means to execute repeated feeding and exposing cycles, said circuit including means to disable said first switch means.

7. Copier apparatus according to claim 1 wherein said programming means includes timing means causing raising and lowering movements of said motor after said exposing.

References Cited

UNITED STATES PATENTS

| | | | |
|---|---|---|---|
| 2,602,664 | 7/1952 | Matchett | 49—26 |
| 2,651,244 | 9/1953 | Ferguson | 95—73 |
| 2,859,331 | 11/1958 | Grimes | 240—7.7 |

NORTON ANSHER, Primary Examiner

RICHARD L. MOSES, Assistant Examiner

U.S. Cl. X.R.

355—13, 28